United States Patent
Kilday et al.

(10) Patent No.: US 9,258,793 B1
(45) Date of Patent: *Feb. 9, 2016

(54) METHOD AND SYSTEM FOR LIGHTWEIGHT SESSIONS IN CONTENT MANAGEMENT CLIENTS

(71) Applicant: EMC Corporation, Hopkinton, MA (US)

(72) Inventors: Roger W. Kilday, Danville, CA (US); Shreyas Satyanand Kaushik, Bangalore (IN); Siddaram Siddanna Bali, Gulbarga (IN); Xiaofeng Ma, San Ramon, CA (US); Shu-Shang Sam Wei, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/630,438

(22) Filed: Sep. 28, 2012

(51) Int. Cl.
*G06F 7/04* (2006.01)
*G06F 15/16* (2006.01)
*G06F 17/30* (2006.01)
*H04L 29/06* (2006.01)
*H04W 60/06* (2009.01)

(52) U.S. Cl.
CPC .................................. *H04W 60/06* (2013.01)

(58) Field of Classification Search
CPC .............................. G06F 21/00; H04W 60/06
USPC ............................................................ 726/7
See application file for complete search history.

(56) References Cited

U.S. PATENT DOCUMENTS

| 7,337,226 B2 * | 2/2008 | Saha et al. ................... 709/226 |
| 8,353,052 B2 * | 1/2013 | Larsson et al. .................. 726/29 |
| 8,547,566 B2 * | 10/2013 | Isshiki ......................... 358/1.14 |
| 2010/0153444 A1 * | 6/2010 | Nayak et al. .................. 707/770 |

* cited by examiner

*Primary Examiner* — Dant Shaifer Harriman
(74) *Attorney, Agent, or Firm* — Dergosits & Noah, LLP; Todd A. Noah

(57) ABSTRACT

Methods and systems for providing light weight client sessions. Connections are immediately decoupled from sessions when released by a user and made available to the same or other users. Re-authentication of the user to re-use a connection can be streamlined by maintaining client login data in a client login record cache.

9 Claims, 6 Drawing Sheets

METHOD AND SYSTEM FOR LIGHTWEIGHT SESSIONS IN CONTENT MANAGEMENT CLIENTS

TECHNICAL FIELD

This disclosure relates generally to the field of database management, and more particularly, to an apparatus and methods for managing client sessions in a content management system.

BACKGROUND

In a distributed computing system having a content management system including a data repository, users (through client devices) establish sessions with the content management system in order to access the data repository for read and/or write operations. When a user completes a session, the session is released into a pool that holds the sessions for a brief time period, typically five seconds. However, since the session encapsulates the connection to the server, the connection remains integrally coupled with the session in the user's level 1 pool, and the connection is not available for others to use. The theory is that the original user may want to re-initiate that session while still logged in, and having the connection still coupled to the session facilitates re-use by the same user.

The reality is that there is very little connection re-use during the period when the original user is logged in, and thus, waiting for five seconds before allowing re-use appears to waste both time and resources.

Therefore, it would be desirable to provide a mechanism that allows connections to be re-used immediately without having to wait for some delay period before decoupling the connection from the session.

DETAILED DESCRIPTION

This disclosure describes methods and systems for providing light weight client sessions. When sessions are released by a user, the encapsulated connection to the server is decoupled from the session and made immediately available to other users (or the same user) in a lever 2 connection pool. In order to re-use connections from the connection pool, the user must be authenticated. Caches are provided for maintaining client login data so that the authentication process can be streamlined for instances where connections are re-used.

1. Operating Environment

Figure 1:
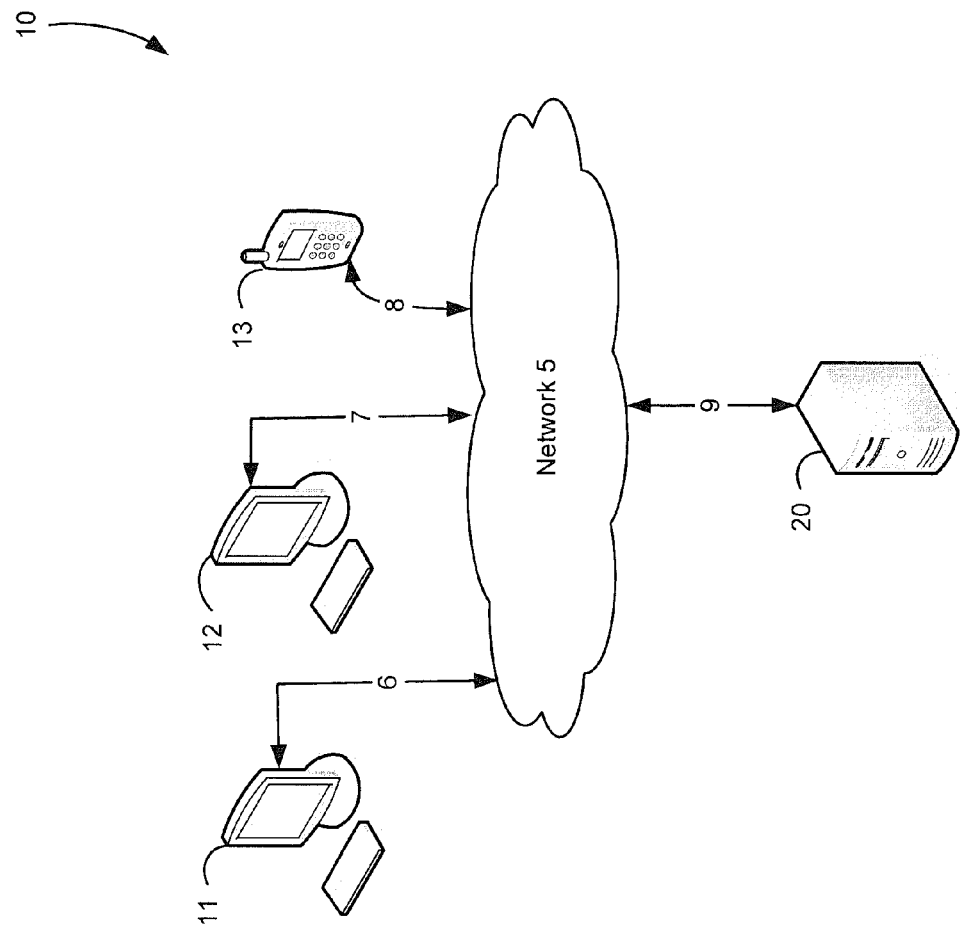
FIG. 1 is a block diagram illustrating a distributed computing system.

FIG. 1 is a simplified block diagram of a distributed computer network 10. Computer network 10 includes a number of client systems 11, 12, 13 coupled to a server system 20 via a communication network 5. Each of the client systems 11, 12, 13 and the server system 20 are coupled to the communication network 5 by communication links 6, 7, 8, 9, respectively. There may be any number of clients and servers in a system. Communication network 5 provides a mechanism for allowing the various components of distributed network 10 to communicate and exchange information with each other.

Communication network 5 may include many interconnected computer systems and communication links. Communication links 6, 7, 8, 9 may be hardwire links, optical links, satellite or other wireless communications links, wave propagation links, or any other mechanisms for communication of information, and may be the same or different for the various hardware components that are coupled to the network 5. Various communication protocols may be used to facilitate communication between the various systems shown in FIG. 1, including TCP/IP, HTTP protocols, wireless application protocol (WAP), vendor-specific protocols, customized protocols and others. In one embodiment, communication network 5 is the Internet, while in other embodiments, any suitable communication network may be used including a local area network (LAN), a wide area network (WAN), a wireless network, an intranet, a private network, a public network, a switched network, any combinations of these, and the like.

Distributed computer network 10 is merely one illustrative embodiment and is not intended to limit the scope of the disclosure. One of ordinary skill in the art would recognize many other variations, modifications and alternatives in how to effectively arrange such components and systems.

In a typical client/server arrangement as shown in FIG. 1, one or more client systems may request information from the server system, which responds to the client by providing the requested information. For this reason, a server system will typically have more computing and storage capacity than client systems, and indeed, the server system may be a gateway and content manager for providing access to content storage and related repository services as further described below. However, a particular computer system may act as either a client or a server depending on whether the computer system is requesting or providing information. Further, although aspects of the subject matter disclosed herein are described as using a client/server environment, it should be apparent that the subject matter may be embodied in other ways, for example, as a stand-alone computer system, or part of a cloud-computing environment.

Server system 20 receives requests for information from one or more of client systems 11, 12, 13 and performs processing in order to satisfy the requests, then forwards the resultant information back to the requesting client system. The processing required to satisfy the request may be performed by server system 20 or may alternatively be delegated to or obtained with the help of other servers connected to communication network 5 or to server system 20.

Client systems 11, 12, 13 enable users to access and query information stored or managed by server system 20. In one embodiment, a web browser application executing on a client system enables users to select, access, retrieve and/or query information stored or managed by server system 20. Examples of web browser programs include the Internet Explorer browser by Microsoft Corporation, the Firefox browser by Mozilla Foundation, and others.

Figure 2:
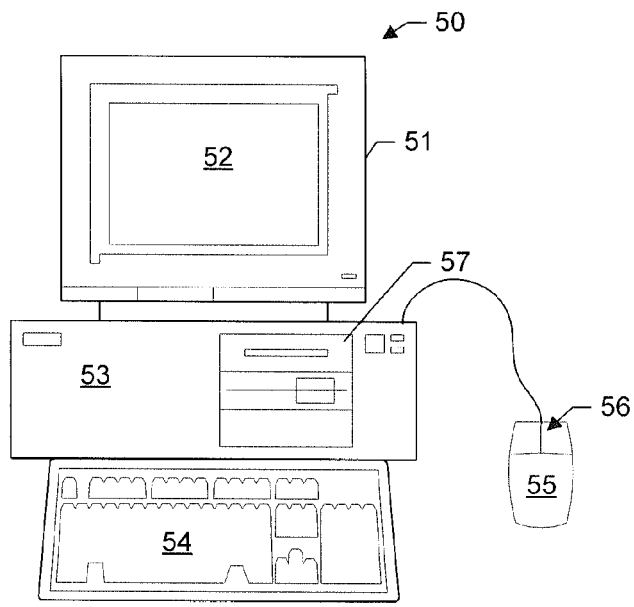
FIG. 2 is a front plan view of a computer workstation useful in the distributed computing system of FIG. 1.

FIG. 2 shows an exemplary computer workstation 50 that may serve as either a client or server system, including a monitor 51 with display screen 52, CPU cabinet 53, keyboard 54 and mouse 55 having one or more selection buttons 56. CPU cabinet 53 houses familiar computer components, such as mass storage devices 57, and other internal components which are not shown, such as a processor, memory, and the like, as further described with reference to FIG. 3 below.

Mass storage devices 57 may include disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

For example, a binary machine-executable version of software instructions for providing the features described herein may be stored or reside in RAM or cache memory, or on mass storage device 57. The source code of the software may also be stored or reside on mass storage device 57 (e.g., hard disk, magnetic disk, tape or CD-ROM). As a further example, software code may be transmitted via wires or radio waves, or downloaded through a network such as the Internet.

Figure 3:
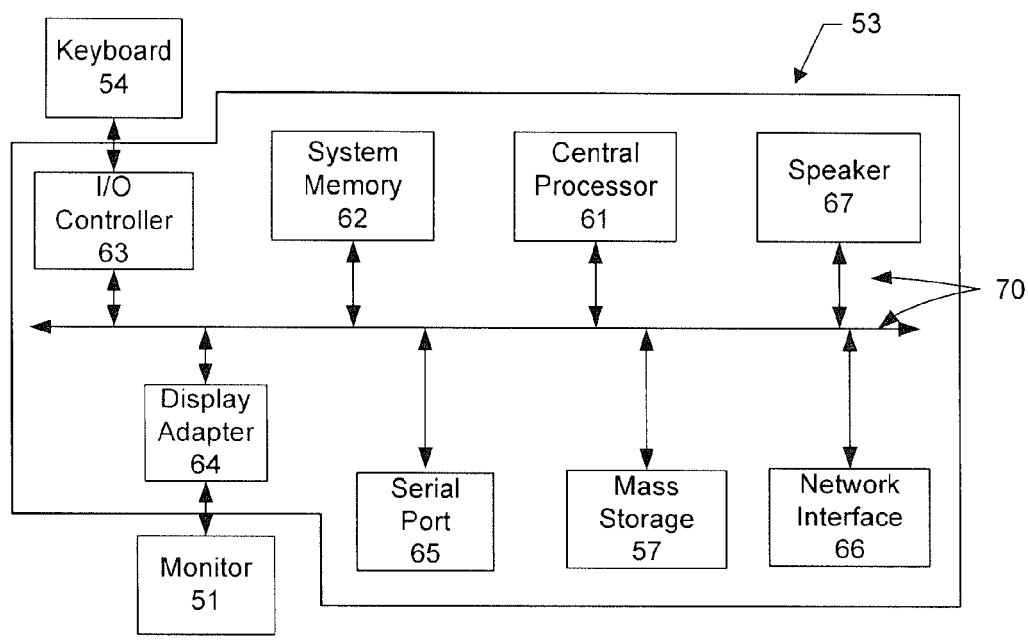
FIG. 3 is a block diagram of the components of the computer workstation of FIG. 2.

A system block diagram of the computer system/workstation 50 is shown in FIG. 3. The display monitor 51, keyboard 54 and storage devices 57 are as shown in FIG. 2. The CPU cabinet 53 contains key components such as central processor 61, system memory 62, input/output (I/O) controller 63, display adapter 64, serial or universal serial bus (USB) port 65, network interface 66, and speaker 67. In other embodiments, a computer system may include more or fewer components and/or subsystems. For one example, a computer system could include more than one processor (i.e., a multiprocessor system) or a system may include a cache memory.

The system bus 70 of computer system 50 is exemplary of an interconnection scheme serving to link the subsystems. For example, speaker 67 could be connected to the other subsystems through a port or have an internal direct connection to central processor 61. The processor 61 may include multiple processors or a multi-core processor, which may permit parallel processing of information. Computer system 50 is only one example of a suitable computer system. Other configurations of components and/or subsystems suitable for use with the methods described herein will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product which stores instructions, such as computer code, that when executed by a computer cause the computer to perform the processes and/or techniques described below.

The computer system 50 runs an operating system (OS) to manage hardware resources and provide common application services for application software. As an example, the computer 50 may run a Microsoft Windows® operating system (e.g., Windows NT, Windows XP, Windows Vista, Windows 7, Windows CE, Windows Mobile), or Linux, UNIX, Sun OS, Solaris, Mac OS X, Alpha OS, AIX, IRIX32, or IRIX64. Other operating systems may also be used.

2. Content Management Platform

Figure 4:
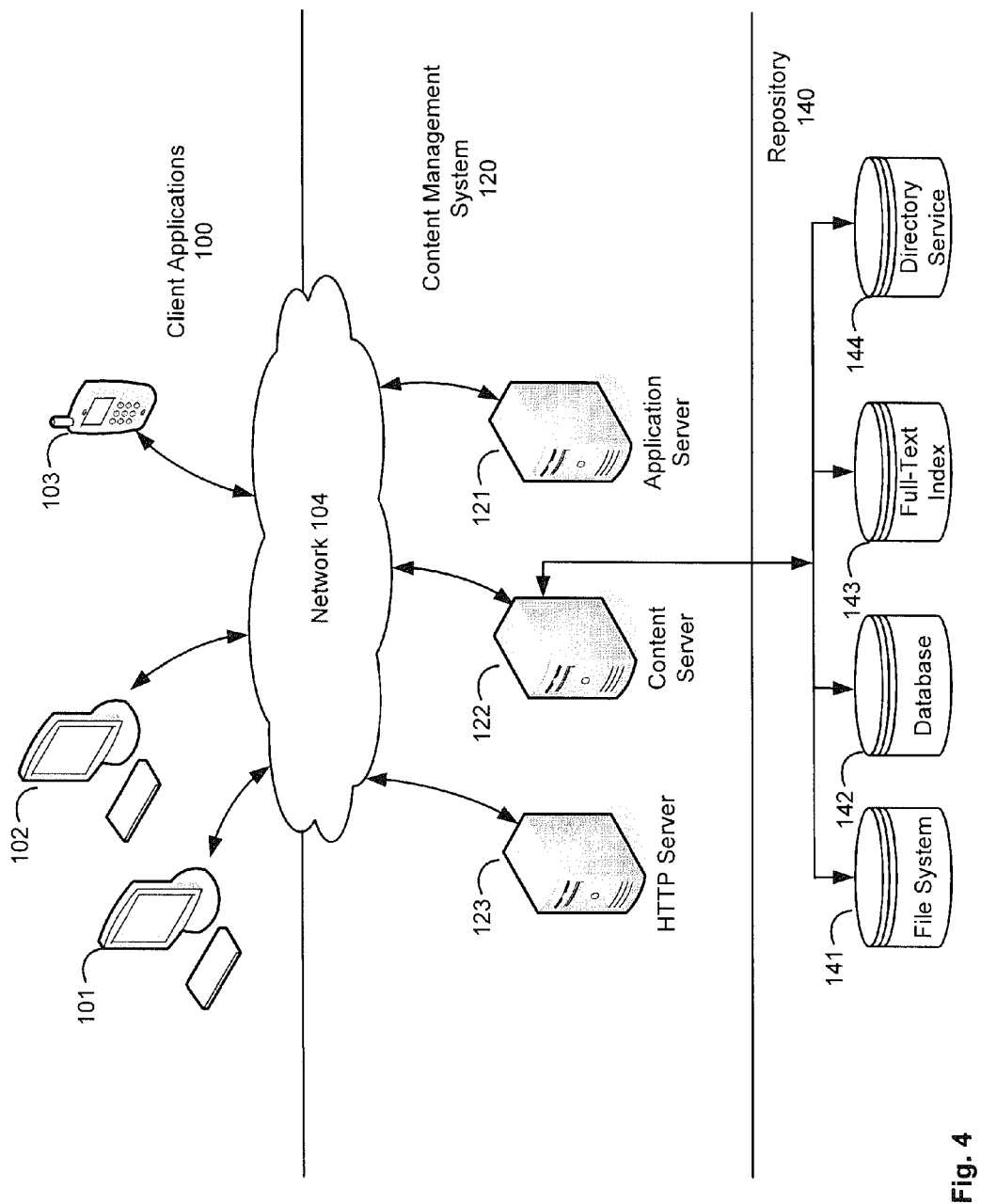
FIG. 4 is a block diagram illustrating the basic structure of an enterprise content management system.

FIG. 4 illustrates a more detailed embodiment of a distributed client/server system that provides an enterprise-level content management and repository service. A repository system 140 is operated and managed by a content management system 120, which in turn provides access to the repository for client applications 100.

The client applications 100 reside in client devices, such as devices 101, 102, 103, which communicate through a network 104 with an application server 121 in order to use one or more applications hosted on the application server. In one embodiment, the network 104 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Client devices may be any type of processor-based digital device, such as desktop or laptop computer, iPhone® or other smart hand-held device, or other.

The application server 121 hosts one or more applications running on a content management platform that provide access to repository 140 for clients hosted on content server 122, which is also accessible to clients via network 104. An HTTP server 123 is also coupled to the network 104 to provide an administrative terminal for system operators to perform system maintenance, logging, access control, etc.

The repository 140 is provided for use by client applications 100, through the content server 122, which is accessible to the client devices through a network 104. The repository 140 may include a file store 141 for storing content items, a relational database 142 for storing attributes/metadata associated with the content items, a full-text index store 143 for the content items, and directory services 144.

A software platform runs on each of the various components, such as the EMC Documentum Platform software and related EMC Enterprise Content Management software, distributed by EMC Corporation, Hopkington, Mass. The Documentum Platform provides capabilities for managing enterprise content and is the foundation for related content management and case management product offerings.

Figure 5:
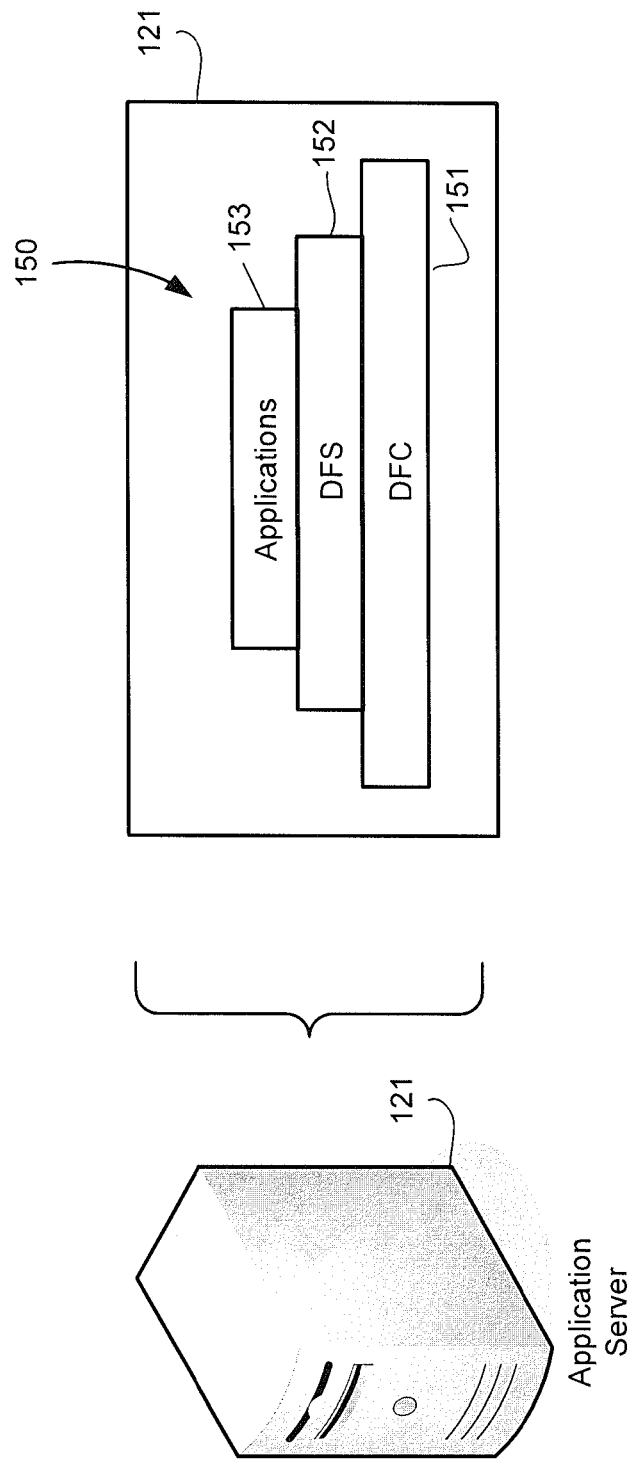
FIG. 5 is a block diagram illustrating the software framework implemented in a component of FIG. 1.

For example, FIG. 5 shows one simplified embodiment of the application server 121, which runs a content management framework 150 having a foundation layer 151, such as Documentum Foundation Classes (DFC), an interface layer 152, such as Documentum Foundation Services (DFS), and one or more applications on application layer 153 having integrated Documentum functionality through a Web Development Kit (WDK) or Webtop, for example. The HTTP server 123 runs a similar content management framework, for applications such as System Administrator or Intranet Client.

DFC is the programming interface for accessing the functionality of the Documentum platform through Java and COM class libraries and underlies all Documentum platforms. DFS is an SOA development framework and application programming interface (API), based on web services, and designed to support interoperable machine-to-machine interaction over a network. DFS is now the primary interface for most developers and users of the Documentum platform.

Each of the clients 101, 102, 103 also runs a content management framework, with the API provided by the Documentum Client Library (DMCL), which is a linked library inside the client application (a DLL in Windows; a shared library in Unix). The DMCL takes documented API calls made by the client application and maps them to Server RPC functions that can be executed by the Content Server. Once the API call has arrived inside the Content Server, processing is no longer affected by the DMCL environment. In fact the DMCL thread that made the call will simply be sleeping awaiting the results of the processing from the server.

The Documentum platform also includes an extensible Business Objects Framework (BOF) which is built into DFC. BOF provides a useful framework and methodology for developing reusable business logic components called Business Objects that can be plugged into middle tier or client applications. More information about the Documentum Platform and related content management and case management product offerings can be found on the EMC website located at URL www.emc.com.

3. Session Management

A session is established between a client and the data repository when the client software issues an API call to connect to the content server and access the data repository. DFC creates a Session on the client, and the content server creates a thread/process representing the session on the server. A session created on the client device typically does not have a timeout associated with it, but will remain in client memory until disconnected. A session on the server, however, will usually have a timeout set in the configuration file. The server assigns a socket connection to the session, and that socket connection is embedded by the client session, i.e., the session and connection are intimately and exclusively coupled.

Sessions are beneficial to users in many respects, and a typical DFC application comprises multiple sessions coupled to the same or different repositories. A session manager is a DFC object that manages sessions on behalf of a single user for one or more repositories. A session manager typically provides the following functionality: create and release sessions; provide session pooling capability; handle transactions; and provide session diagnostic data. An effective session manager is tasked simply with (i) acquiring the session, (ii) creating or retrieving an object, (iii) manipulating the object, and (iv) releasing the session.

Figure 6:
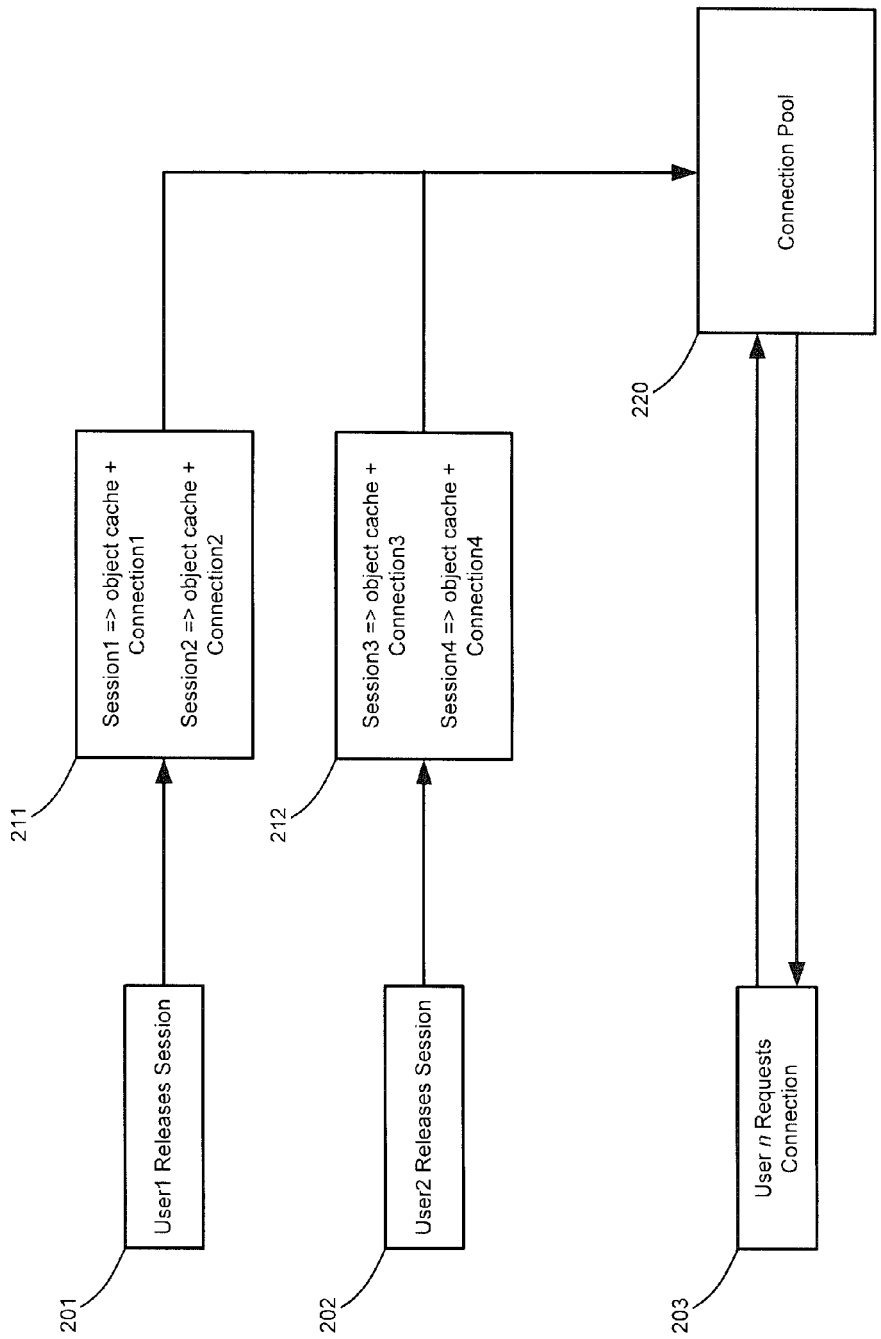
FIG. 6 is a schematic block diagram flow illustrating a prior art method for releasing client sessions.

Referring now to FIG. 6, one prior approach to managing sessions and connections on the client is illustrated schematically. When a first user 201 finishes a session, the session is released into the first user's session manager cache 211 with the connection still coupled to the session. For example, a first session, Session1, and a second session, Session 2, have been released to the cache 211. The first session consists of an object cache and a first connection, Connection1, while the second session consists of an object cache and a second connection, Connection2. Likewise, when a second user 202 finishes a session, the session is released into the second user's session manager cache 212 with the connection still coupled to the session. For example, a third session, Session3, and a fourth session, Session4, have been released to the cache 212. The third session consists of an object cache and a third connection, Connection3, while the fourth session consists of an object cache and a fourth connection, Connection4.

The session manager caches 211 and 212 are considered Level 1 pools, each pool containing only sessions and coupled connections for a specific user. After a timeout, typically five seconds (configurable), session objects are flushed from the session pool and the connection released to a connection pool 220, which is considered a Level 2 pool, i.e., shared by multiple users. However, because of the timeout associated with the level 1 pool, many existing connections sit unused while other new connections are created.

The connection pool 220 may be scoped by clients requesting connections. For example, a third user 203 requesting a new connection will look first to the connection pool 220 to re-use an existing connection before asking the server to provide a new connection. Connections in the connection pool are released after a time delay, typically five minutes (configurable).

In a multi-session environment, holding the connections in the session pool can be costly since these sessions cannot be shared with other session managers. Thus, these pooled connections generally remain idle. The presence of too many idle connections will increase the load on the content server and slow down processing at the content server.

Figure 7:
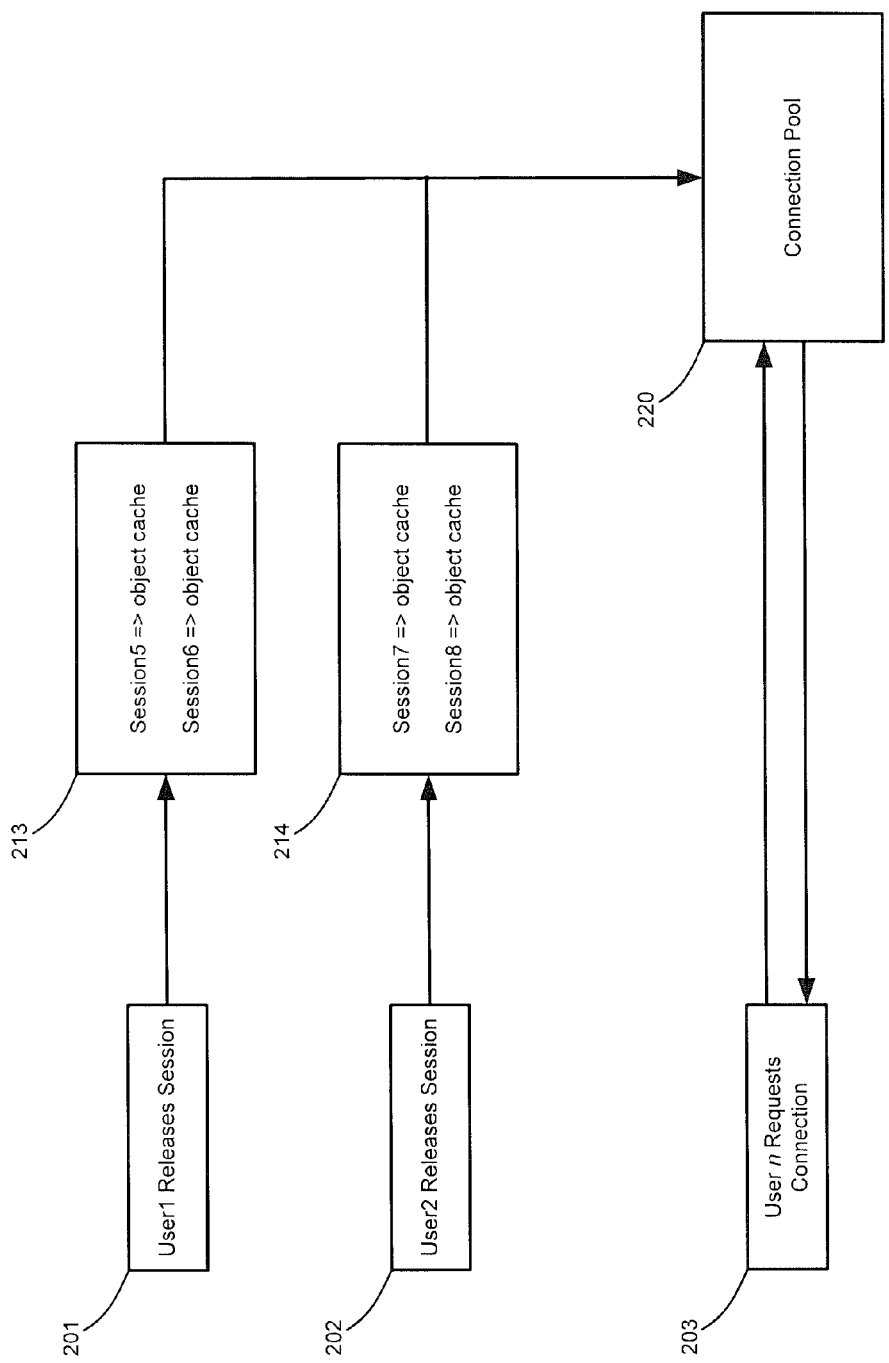
FIG. 7 is a schematic block diagram flow illustrating an improved method for releasing client sessions.

Referring to FIG. 7, an improved method of managing sessions and connections on the client is illustrated. Now, when the first user 201 or second user 202 finishes a session, those sessions are released into session manager caches 213 and 214, respectively, but the connections are decoupled from the sessions and released immediately to the level 2 connection pool 220. For example, the first user 201 has released a fifth session, Session5, and a sixth session, Session6, into the session manager cache 213 or level 1 pool, but each of these sessions has been decoupled from its connection, and those connections have been sent immediately to the connection pool 220. Likewise, the second user 202 has released a seventh session, Session7, and an eighth session, Session8, into the session manager cache 214, but each of these sessions has also been decoupled from its connection, and those connections have also been sent immediately to the connection pool 220. Thus, any user including third user 203 can immediately access and re-use the discarded connections to the server thereby avoiding unnecessary creation of new connections.

For the connection (and its corresponding server session) to be shared by different users, the content server has to authenticate the user each time the user context is switched from one user to another. To do so, the client issues an RPC to AUTHENTICATE_USER. However, to reduce database access during the authentication process, the server should cache enough information to share with sessions when the same user connects to a different session. A new argument, RECONNECT, is used to indicate the session is for sharing by the DFC session pool. This is a flag that will allow the server to bypass some of the authentication steps that are not necessary for a reconnection to an existing connection/server session.

Each time a user has a successful login, a user login record is created with the user's login credentials and an expiration time. A cache for the user login record is checked to see if the RECONNECT arguments passed by the user can be honored. The user login record typically contains the user name, user login name, session token and user login credentials.

The user login record cache is implemented as a hash cache, and can be realized using the pseudo code shown in Table I below.

TABLE I

Generate hash code for user login name and session token;
Find hash bucket;

TABLE I-continued

Compare user login name, session token and user credentials;
If all equal, then user login record found;
Update the user login record expiration time; and
Move the entry to the front the LRU list.

The user login record is flushed out of the cache if any security related changes are made to the dm_user object, such as user name, password, or group changes. Also, if the user gets deleted, the user login record will be flushed out. The login record is flushed out directly from shared memory in the local server. For a remote server, the cache flush is triggered by a change checker routine on the change record for the user object. Since the change record does not indicate the specific user changed, the whole cache is flushed out. Re-initialization of the server also causes the whole cache to be flushed.

A global cache called the client instance cache is kept in shared memory and used to save the client verification results. The client instance cache contains the client instance ID, the client host name and the client digital signature. If the DFC instance is found in the cache, the cache entry is not expired, and the client hosts are the same, then the server can skip the step of verifying the security certificate.

Another cache called the group cache keeps for each user a list of all groups the user belongs to. Each time a user logs in, the group list gets created from the database, and it may be cached and shared by sessions. Whenever there is a change in the group, the group cache is flushed.

Thus, if the RECONNECT flag is set, the server checks for a user login cache entry using the user login name and session token. If a cache entry is found and not expired, the server will use the cached credentials to authenticate the user. The server compares the cached credentials to the user's login credentials, and will find a match is both have the same password, client host and user ID. If not, then the server proceeds with its regular authentication process.

The methods described herein provide improved performance on the server side since no (or fewer) requests for new connections are made. Further, the client can get sessions back with their object caches intact. On the whole, this means that the session footprint will be smaller. Also, if the load is high, connections are available for immediate re-use that are independent of sessions. This means the system can do more with less resources, and scalability is enhanced.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, or execute acts in a different order than set out in the illustrated embodiments.

The present methods, systems and articles also may be implemented as a computer program product that comprises a computer program mechanism embedded in a computer readable storage medium. For instance, the computer program product could contain program modules for installing and operating the applications described above. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and applications via the use of examples. Insofar as such examples contain one or more functions or operations, it will be understood by those skilled in the art that each function or operation within such examples can be implemented, individually and/or collectively, by a wide range of hardware, software, firmware, or virtually any combination thereof. In one embodiment, the present subject matter may be implemented via Application-Specific Integrated Circuits (ASICs). However, those skilled in the art will recognize that the embodiments disclosed herein, in whole or in part, can be equivalently implemented in standard integrated circuits, as one or more computer programs running on one or more computers, as one or more programs running on one or more controllers (e.g., microcontrollers) as one or more programs running on one or more processors (e.g., microprocessors), as firmware, or as virtually any combination thereof, and that designing the circuitry or writing the code for the software and or firmware would be well within the skill of one of ordinary skill in the art in light of this disclosure.

In addition, those skilled in the art will appreciate that the applications taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

These and other changes can be made to the present systems, methods and applications in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

We claim:

1. A method for managing multiple client sessions in a distributed computing environment, wherein multiple clients may be coupled to at least one content server through a network, comprising:
   receiving user login data, the user login data including user credentials;
   establishing a client session based on the user login data, the client session encapsulating a connection to the server;
   decoupling, upon detecting a conclusion of the client session, the encapsulated connection from the client session, prior to releasing the client session to a session pool;
   releasing, by the server in response to the client, the decoupled client session to the session pool;
   immediately releasing the decoupled connection to a connection pool after decoupling the encapsulated connection from the client session, wherein the release of the decoupled connection to the connection pool bypasses the release of the encapsulated connection to the session pool;
   receiving a request to re-use the decoupled connection;
   based on the received request, comparing the user credentials associated with the user login data with a copy of the user credentials stored in a user login record within a user login record cache, wherein the user login record includes a user login record expiration time;

performing an authentication process using the copy of the user credentials stored in the user login record to authenticate the client when the user credentials match and the expiration time has not passed; and requesting verification of the user credentials to authenticate the client when the user credentials do not match or when the user login record expiration time has passed.

2. The method of claim 1, further comprising:
caching the user login data for the client in a user login record cache.

3. The method of claim 1, wherein the user login credentials are flushed from the user login record cache upon satisfying predefined criteria.

4. The method of claim 1, further comprising:
caching an updated expiration time associated with login credentials for the client in a user login record cache each time the server receives user login data from the client.

5. A non-transitory computer-readable storage medium encoded with executable instructions for managing multiple client sessions in a distributed computing environment, wherein multiple clients may be coupled to at least one content server through a network, comprising:

receiving user login data, the user login data including user credentials;

establishing a client session based on the user login data, the client session encapsulating a connection to the server;

decoupling, upon detecting a conclusion of the client session, the encapsulated connection from the client session, prior to releasing the client session to a session pool;

releasing, by the server in response to the client, the decoupled client session to the session pool;

immediately releasing the decoupled connection to a connection pool after decoupling the encapsulated connection from the client session, wherein the release of the decoupled connection to the connection pool bypasses the release of the encapsulated connection to the session pool;

receiving, by a server from the client, a request to re-use the decoupled connection;

based on the received request, comparing the user credentials associated with the user login data with a copy of the user credentials stored in a user login record within a user login record cache, wherein the user login record includes a user login record expiration time;

performing a first authentication process using the copy of the user credentials stored in the user login record to authenticate the client when the user credentials match and the expiration time has not passed; and requesting verification of the user credentials to authenticate the client when the user credentials do not match or when the user login record expiration time has passed.

6. The computer-readable storage medium of claim 5, the instructions further comprising:
caching the user login data for the client in a user login record cache.

7. The computer-readable storage medium of claim 5, wherein the user login credentials are flushed from the user login record cache upon satisfying predefined criteria.

8. A content management system for managing multiple client sessions in a distributed computing environment, the system comprising:

one or more processors; and a non-transitory computer readable medium storing a plurality of instructions, which when executed, cause the one or more processors to:

receive user login data, the user login data including user credentials;

establish a client session based on the user login data, the client session encapsulating a connection to the server;

decouple, upon detecting a conclusion of a client session, the encapsulated connection from a client session, prior to releasing the client session to a session pool;

release, by the content server in response to a client, the decoupled client session to the session pool;

immediately release the decoupled connection to a connection pool after decoupling the encapsulated connection from the client session, wherein the release of the decoupled connection to the connection pool bypasses the release of the encapsulated connection to the session pool;

receive, by a server from the client, a request to re-use the decoupled connection;

based on the received request, compare the user credentials associated with the user login data with a copy of the user credentials stored in a user login record within a user login record cache, wherein the user login record includes a user login record expiration time;

perform a first authentication process using the copy of the user credentials stored in the user login record to authenticate the client when the user credentials match and the expiration time has not passed; and request verification of the user credentials to authenticate the client when the user credentials do not match or when the user login record expiration time has passed.

9. The content management system of claim 8, further comprising: a user login record cache for caching the user login data of the client and the expiration time each time the user login data is received.

* * * * *